(12) United States Patent
Takahashi

(10) Patent No.: US 6,671,194 B2
(45) Date of Patent: Dec. 30, 2003

(54) SWITCHING POWER SUPPLY UNIT

(75) Inventor: Toshiyuki Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/183,215

(22) Filed: Jun. 27, 2002

(65) Prior Publication Data
US 2003/0015998 A1 Jan. 23, 2003

(30) Foreign Application Priority Data
Jun. 29, 2001 (JP) .................................. P2001-200013

(51) Int. Cl.⁷ .............................................. H02M 7/00
(52) U.S. Cl. ............................ 363/69; 363/65; 363/70
(58) Field of Search ............................ 363/65, 67, 69, 363/70; 323/901

(56) References Cited

U.S. PATENT DOCUMENTS

| | | | | |
|---|---|---|---|---|
| 5,612,581 A | * | 3/1997 | Kageyama | 307/64 |
| 5,894,414 A | * | 4/1999 | Jiang | 363/65 |
| 6,014,322 A | * | 1/2000 | Higashi et al. | 363/65 |
| 6,118,674 A | * | 9/2000 | Higashi | 363/71 |
| 6,229,723 B1 | * | 5/2001 | Umetsu et al. | 363/71 |
| 6,414,864 B1 | * | 7/2002 | Hoshi | 363/69 |
| 6,525,947 B2 | * | 2/2003 | Umetsu et al. | 363/21.15 |

* cited by examiner

Primary Examiner—Bao Q. Vu
(74) Attorney, Agent, or Firm—Sonnenschein, Nath & Rosenthal LLP

(57) ABSTRACT

To provide a switching power supply unit that is configured in that a stand-by power supply does not stop before a main power supply does at the time of cutting an AC input without having excesses of capacity and a power-factor improvement circuit that is not fundamentally necessary, provided is a back-up circuit 140 that supplies the direct current output obtained by a main rectifying and smoothing circuit 111 of a main power supply circuit 110 to a sub converting circuit 122 of a stand-by power supply circuit 120.

5 Claims, 2 Drawing Sheets

SWITCHING POWER SUPPLY UNIT

RELATED APPLICATION DATA

The present application claims priority to Japanese Application(s) No(s). P2001-200013 filed Jun. 29, 2001, which application(s) is/are incorporated herein by reference to the extent permitted by law.

BACKGROUND OF THE INVENTION

1. Field of the Invention

The present invention relates to a switching power supply unit having stand-by output.

2. Description of the Prior Art

Conventionally, widely used is a switching power supply unit that is configured to switch a direct current obtained by rectifying and smoothing a commercial alternating current, for example, at high frequency of about 100 kHz and convert the current into a desired voltage by a transformer.

As a system for controlling an output voltage in the switching power supply unit, employed is the system such as a pulse width modulation (PWM) control system that controls a duty ratio of a switching pulse in accordance with changes in the output voltage, a frequency control system or phase control system adopting resonance that controls a frequency or phase of a switching pulse, etc.

In general, in regard to a switching power supply unit included in an electrical apparatus such as a television receiver, or home video system, etc., a main power supply circuit and a stand-by power supply circuit are provided together as shown in FIG. 1, for example, so as to supply a main power supply necessary for the apparatus in an operation state and a stand-by power supply necessary in a stand-by state.

More specifically, a conventional switching power supply unit 200 shown in FIG. 1 comprises a main power supply circuit 240 for main output, which is connected to a commercial alternating current power supply AC through a relay switch SW1, and a stand-by power supply circuit 280 for stand-by output, which is independent of the main power supply circuit 240.

The main power supply circuit 240 is configured to switch the rectified smoothed output provided by a main rectifying and smoothing circuit 210, which rectifies and smooths an alternating current power supply input, by a main converting circuit 220, and rectify and smooth the output of a main converting transformer 225, to which the switched output provided by the main converting circuit 220 is supplied, in a main output circuit 230, thereby obtaining a main output.

The stand-by power supply circuit 280 is configured to switch the rectified smoothed output provided by a sub rectifying and smoothing circuit 250, which rectifies and smooths the alternating current power supply input, by a sub converting circuit 260, and rectify and smooth the output of a sub converting transformer 265, to which the switched output provided by the sub converting circuit 260 is supplied, in a stand-by output circuit 270, thereby obtaining a stand-by output.

The main rectifying and smoothing circuit 210 in the main power supply circuit 240 is constituted by a rectifying circuit 211, a power-factor improvement circuit (PFC) 212, and a smoothing capacitor 213. More specifically, the main power supply circuit 240 supplies a main power supply necessary for the apparatus including the circuit in an operation state, and thus has large output power. For this reason, the power-factor improvement circuit 212 is provided in the main rectifying and smoothing circuit 210 to reduce a high frequency current that exerts a harmful influence on power equipments etc.

On the other hand, the stand-by power supply circuit 280 supplies a stand-by power supply necessary for the apparatus including the circuit in a stand-by state to, for example, a remote control circuit. Therefore, the output power of the circuit is in such a degree that a power-factor improvement circuit is not required, and the sub rectifying and smoothing circuit 250 in the stand-by power supply circuit 280 is constituted by a rectifying circuit 251 and a smoothing capacitor 252.

In the conventional switching power supply unit 200 constructed as described above, in the case that AC input is cut, the lower the AC input voltage is, the smaller the amount of charge stored in the smoothing capacitor 252 of the sub rectifying and smoothing circuit 250 in the stand-by power circuit 280 in which no power-factor improvement circuit is provided becomes in comparison with the amount of charge stored in the smoothing capacitor 213 of the main rectifying and smoothing circuit 210 in the main power supply circuit 240 that comprises the power-factor improvement circuit 212. Therefore, the output from the stand-by power supply circuit 280 stops before the output from the main power supply circuit 240 stops.

Meanwhile, in regard to electronics including a switching power supply unit, in the case that the stand-by power supply is not desired to stop before the main power supply stops, for example, in the case that a system performs an ending process with a stand-by power supply at the time of cutting an AC input, the following measures are taken so that the stand-by power supply does not stop before the main power supply stops.

The capacity of the smoothing capacitor 252 provided in the sub rectifying and smoothing circuit 250 of the stand-by power supply circuit 280 is increased so that the holding time of output in the stand-by power supply circuit 280 becomes equal to or above one in the main power supply circuit 240.

Alternatively, a power-factor improvement circuit is also provided in the sub rectifying and smoothing circuit 250 of the stand-by power supply circuit 280 so that the holding time of output in the stand-by power supply circuit 280 becomes equal to or above one in the main power supply circuit 240.

However, in a normal operation state in that an alternating current supply is supplied, the smoothing capacitor 252 in the sub rectifying and smoothing circuit 250 exceeds the capacity limit, or the sub rectifying and smoothing circuit 250 of the stand-by power supply circuit 280 has an unnecessary power-factor improvement circuit.

Therefore, if such measures described above are taken, they cause harmful effects for miniaturizing, reducing cost, and improving reliability of the switching power supply unit.

SUMMARY OF THE INVENTION

To solve the problem described above, an object of the present invention, which has been achieved in view of the situation described above, is to provide a switching power supply unit, which does not have excesses of capacity and a power-factor improvement circuit, which is not fundamentally necessary, and is configured in that the stand-by power supply does not stop before the main power supply does at the time of cutting an AC input.

According to an aspect of the invention, a switching power supply unit is characterized by comprising: a main rectifying and smoothing circuit which rectifies and smooths alternating current power supply input; a main converting circuit connected to the main rectifying and smoothing circuit; a main converting transformer to which the switched output provided by the main converting circuit is supplied; a main output circuit which rectifies and smooths the output from the main converting transformer and obtains main output; a sub rectifying and smoothing circuit which rectifies and smooths the alternating current power supply input; a sub converting circuit connected to the sub rectifying and smoothing circuit; a sub converting transformer to which the switched output provided by the sub converting circuit is supplied; a stand-by output circuit which rectifies and smooths the output from the sub converting transformer and obtains stand-by output; and a back-up circuit which supplies direct current output obtained by the main rectifying and smoothing circuit.

DETAILED DESCRIPTION OF THE INVENTION

The embodiment of the invention now will be described in detail with reference to the accompanying drawings.

Figure 1:
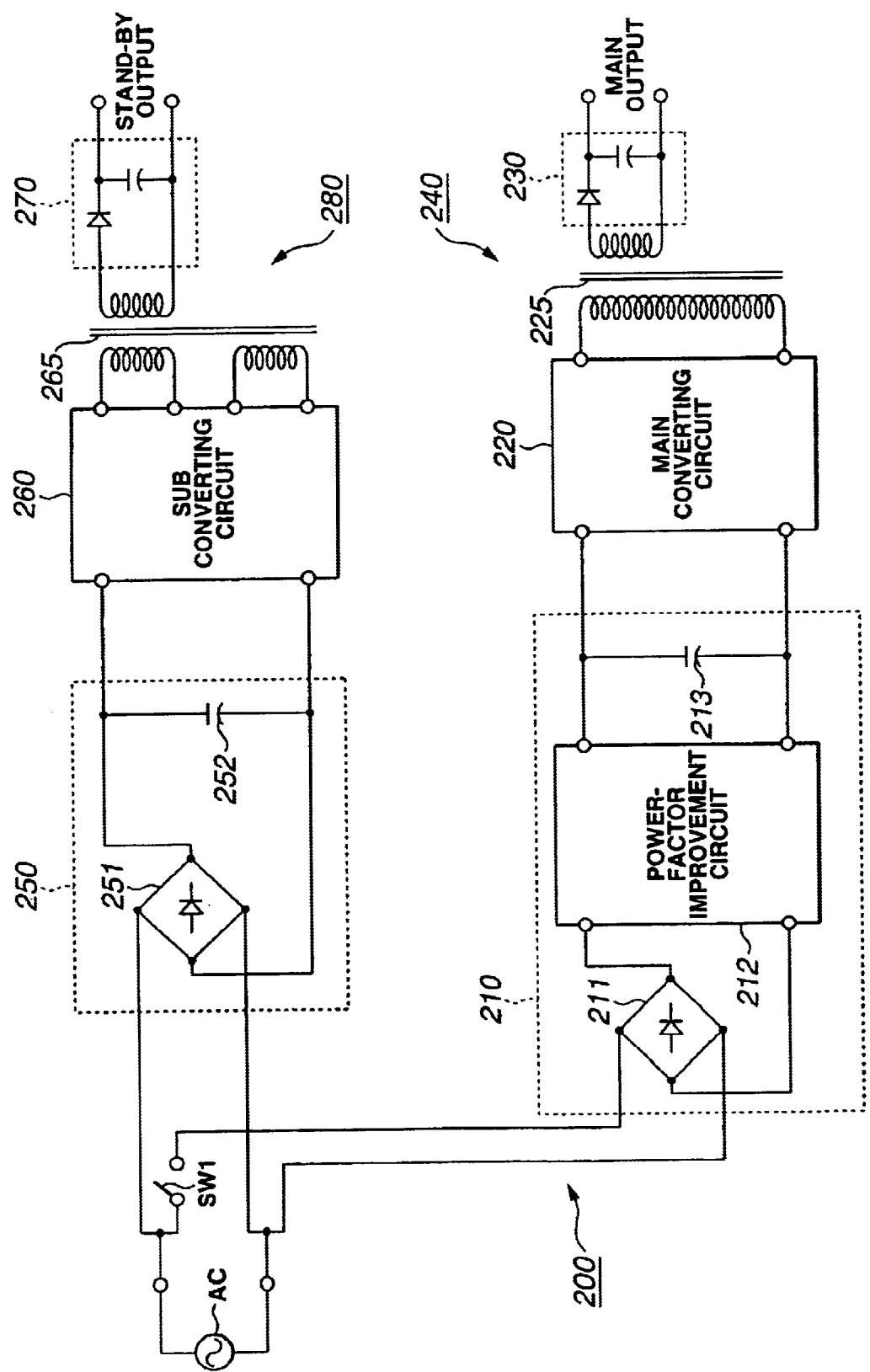
FIG. 1 is a circuit diagram showing a configuration of the conventional switching power supply unit.
Figure 2:
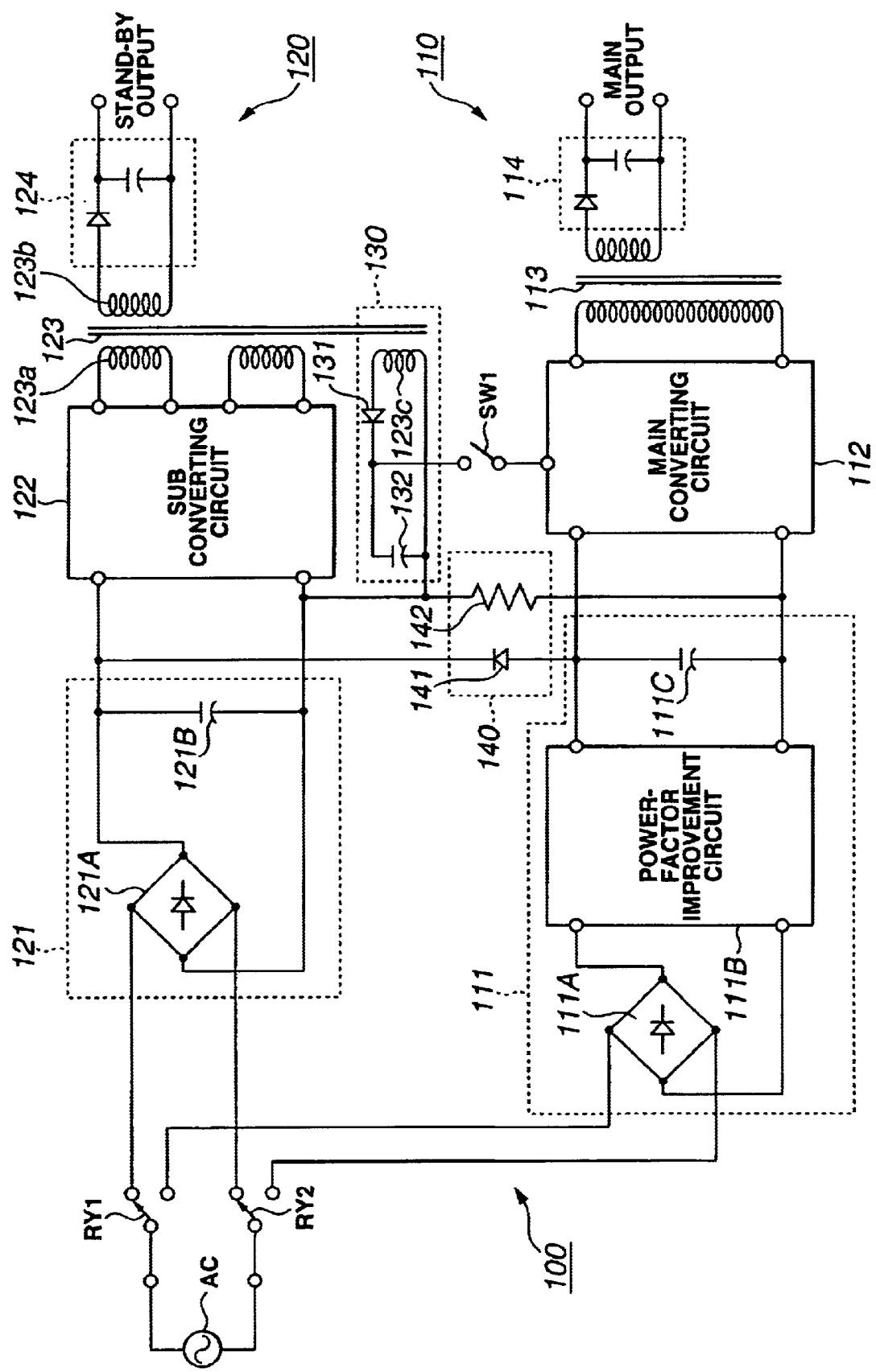
FIG. 2 is a circuit diagram showing a configuration of the switching power supply unit according to the invention.

A switching power supply unit according to the invention is configured, for example, as shown in FIG. 2. The switching power supply unit 100 shown in FIG. 2 comprises a main power supply circuit 110 for main output, which is selectively connected to a commercial alternating current power supply AC through relay switches RY1 and RY2, and a stand-by power supply circuit 120 for stand-by output.

The main power supply circuit 110 is configured to switch the rectifying and smoothing output supplied from a main rectifying and smoothing circuit 111, which rectifies and smooths the alternating current power supply input supplied from the commercial alternating current power supply AC through the relay switches RY1 and RY2, by a main converting circuit 112, and rectify and smooth the output of a main converting transformer 113, to which the switched output provided by the main converting circuit 112 is supplied, in a main output circuit 114, thereby obtaining a main output.

The stand-by power supply circuit 120 is configured to switch the rectified smoothed output provided by a sub rectifying and smoothing circuit 121, which rectifies and smooths the alternating current power supply input supplied from the commercial alternating current power supply AC through the relay switches RY1 and RY2, by a sub converting circuit 122, and rectify and smooth the output of a sub converting transformer 123, to which the switched output provided by the sub converting circuit 122 is supplied, in a stand-by output circuit 124, thereby obtaining a stand-by output.

The main rectifying and smoothing circuit 111 in the main power supply circuit 110 is constituted by a rectifying circuit 111A, a power-factor improvement circuit (PFC) 111B, and a smoothing capacitor 111C. More specifically, the main power supply circuit 110 supplies a main power necessary for an apparatus including the circuit in an operation state, and thus has large output power. For this reason, the power-factor improvement circuit 111B is provided in the main rectifying and smoothing circuit 111 to reduce a high frequency current that exerts a harmful influence on power equipments etc.

On the other hand, the stand-by power supply circuit 120 supplies a stand-by power supply necessary for the apparatus including the circuit in a stand-by state to, for example, a remote control circuit. Therefore, the output power of the circuit is in such a degree that a power-factor improvement circuit is not required, and the sub rectifying and smoothing circuit 121 in the stand-by power supply circuit 120 is constituted by a rectifying circuit 121A and a smoothing capacitor 121B.

In the switching power supply unit 100, a starting circuit 130 is constituted by a diode 131 connected to a tertiary winding 123c of a sub converting transformer 123 in the stand-by power supply circuit 120 and a capacitor 132. The starting circuit 130 is connected to the main converting circuit 112 in the main power supply circuit 10 through the relay switch SW1.

Further, there is provided a back-up circuit 140 that supplies the direct current output obtained by the main rectifying and smoothing circuit 111 in the main power supply circuit 110 to the sub converting circuit 122 in the stand-by power supply circuit 120. The back-up circuit 140 comprises a back-up diode 141 and a return resistor 142, which connect the main rectifying and smoothing circuit 111 to the sub converting circuit 122.

In the switching power supply unit 100 having the configuration described above, when alternating current power supply is supplied from the commercial alternating current power supply AC, the sub rectifying and smoothing circuit 121 rectifies and smooths the alternating current power supply input supplied through the relay switches RY1 and RY2. Then, the rectified and smoothed output is supplied to the sub converting circuit 122, thereby the stand-by power supply circuit 120 starts operating.

In the stand-by power supply circuit 120, the rectified and smoothed output supplied by the sub rectifying and smoothing circuit 121 is switched by the sub converting circuit 122. The switched output is supplied to a primary winding 123a of the sub converting transformer 123. Further, the output obtained in a secondary winding 123b of the sub converting transformer 123 is rectified and smoothed by the stand-by output circuit 124 and supplied as a stand-by output to a set not shown in the drawing.

Further, the stand-by power supply circuit 120 supplies the output obtained in the tertiary winding 123c of the sub converting transformer 123 in the stand-by power supply circuit 120 to the starting circuit 130.

In the main power supply circuit 110 in the switching power supply unit 100, when an instruction to turn the main power supply on in the set to which the stand-by output is supplied from the stand-by power supply circuit 120, the relay switches RY1, RY2, and SW1 operate, thereby the main power supply circuit 110 turns into an ON-state.

More specifically, in the main power supply circuit 110, the alternating current power supply input supplied from the commercial alternating current power supply AC through the relay switches RY1 and RY2 is rectified and smoothed by the main rectifying and smoothing circuit 111, and the rectified and smoothed output is supplied to the main converting circuit 112. Subsequently, the main converting circuit 112 is started with a starting current supplied from the starting circuit 130 through the relay switch SW1 and starts to switch the rectified and smoothed output supplied from the main rectifying and smoothing circuit 111.

The rectified and smoothed output supplied from the main rectifying and smoothing circuit 111 is switched by the main converting circuit 112, and the switched output is supplied to the main output circuit 114 through the main converting transformer 113.

The main output circuit 114 rectifies and smooths the output from the main converting transformer 113 and supplies the rectified and smoothed output to a set not shown in the drawing as a main output.

When the main power supply circuit 110 is turned on, the alternating current power supply input to the stand-by power supply circuit 120 is stopped. However, the rectified and smoothed output obtained by the main rectifying and smoothing circuit 111 in the main power supply circuit 110 is supplied to the sub converting circuit 122 in the stand-by power supply circuit 120 through the back-up circuit 140. Then, the stand-by power supply circuit 120 switches the rectified and smoothed output in the main rectifying and smoothing circuit 111 by the sub converting circuit 122, and rectifies and smooths the output obtained in the secondary winding 123b of the sub converting transformer 123 by the stand-by output circuit 124, thereby supplying the rectified and smoothed output to a set not shown in the drawing as a stand-by output.

When the main power supply circuit 110 is turned on and the alternating current power supply input from the commercial alternating current power supply AC is cut, the switching power supply unit 100 receives the backup from the smoothing capacitor 111C in the main rectifying and smoothing circuit 111 of the main power supply circuit 110. Then, the holding time of output in the stand-by power supply circuit 280 becomes equal to or above one in the main power supply circuit 240.

That is, the stand-by power supply circuit 280 comes to have a composed capacity of the smoothing capacitor 111C of the main rectifying and smoothing circuit 111 and the smoothing capacitor 121B of the sub rectifying and smoothing circuit 121, thereby definitely stopping the output after the main power supply circuit 240 at the time of cutting the AC input.

As described above, the switching power supply unit according to the invention is configured in that the rectified and smoothed output obtained by the main rectifying and smoothing circuit is supplied to the sub converting circuit through the back-up circuit. Therefore, the output of the stand-by power supply can be stopped definitely after the main power supply does at the time of cutting the AC input, without having excesses of capacity and a power-factor improvement circuit, which is not fundamentally necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A switching power supply unit comprising:
    a main rectifying and smoothing circuit which rectifies and smooths alternating current power supply input;
    a main converting circuit connected to the main rectifying and smoothing circuit;
    a main converting transformer to which the switched output provided by the main converting circuit is supplied;
    a main output circuit which rectifies and smooths the output from the main converting transformer and obtains main output;
    a sub rectifying and smoothing circuit which rectifies and smooths the alternating current power supply input;
    a sub converting circuit connected to the sub rectifying and smoothing circuit;
    a sub converting transformer to which the switched output provided by the sub converting circuit is supplied;
    a stand-by output circuit which rectifies and smooths the output from the sub converting transformer and obtains stand-by output; and
    a back-up circuit which supplies direct current output obtained by the main rectifying and smoothing circuit to the sub converting circuit.

2. The unit according to claim 1, wherein the back-up circuit comprises a diode which connects the main rectifying and smoothing circuit to the sub converting circuit and a resistor.

3. The unit according to claim 1, wherein the main rectifying and smoothing circuit comprises a power-factor improvement circuit.

4. The unit according to claim 1, wherein the main converting circuit comprises a starting circuit.

5. The unit according to claim 4, wherein the starting circuit has a diode which rectifies voltage of an output winding of the sub converting transformer, a capacitor which holds the rectified voltage and a switch, and the switch is configured to be controlled by an instruction from a set connected to the sub converting circuit.

* * * * *